US 11,511,730 B2

(12) United States Patent
Miyamoto

(10) Patent No.: US 11,511,730 B2
(45) Date of Patent: Nov. 29, 2022

(54) DRIVE DEVICE, AND VEHICLE

(71) Applicant: Hitachi Automotive Systems, Ltd., Hitachinaka (JP)

(72) Inventor: Shogo Miyamoto, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 230 days.

(21) Appl. No.: 16/963,739

(22) PCT Filed: Jan. 24, 2019

(86) PCT No.: PCT/JP2019/002178
§ 371 (c)(1),
(2) Date: Jul. 21, 2020

(87) PCT Pub. No.: WO2019/159625
PCT Pub. Date: Aug. 22, 2019

(65) Prior Publication Data
US 2021/0094531 A1 Apr. 1, 2021

(30) Foreign Application Priority Data

Feb. 15, 2018 (JP) .............................. JP2018-025108

(51) Int. Cl.
*B60W 20/30* (2016.01)
*B60K 6/365* (2007.10)
(Continued)

(52) U.S. Cl.
CPC ............. *B60W 20/30* (2013.01); *B60K 6/365* (2013.01); *B60K 6/543* (2013.01); *B60W 10/02* (2013.01);
(Continued)

(58) Field of Classification Search
None
See application file for complete search history.

(56) References Cited

U.S. PATENT DOCUMENTS 6,302,227 B1   10/2001   Takemura et al.
6,306,057 B1   10/2001   Morisawa et al.
(Continued)

FOREIGN PATENT DOCUMENTS

JP   2000-92612 A    3/2000
JP   2000-219055 A   8/2000
(Continued)

OTHER PUBLICATIONS

Written Opinion from JP 2020500355 (dated 2021).*
International Search Report (PCT/ISA/210) issued in PCT Application No. PCT/JP2019/002178 dated May 21, 2019 with English translation (four (4) pages).
Japanese-language Written Opinion (PCT/ISA/237) issued in PCT Application No. PCT/JP2019/002178 dated May 21, 2019 (five (5) pages).
(Continued)

*Primary Examiner* — Dirk Wright
(74) *Attorney, Agent, or Firm* — Crowell & Moring LLP

(57) ABSTRACT

The object of the invention is to travel backward by an engine alone in a state where an electric motor is disconnected. Thus, external teeth are formed on the outer periphery of a ring gear which meshes with a first sun gear via a first pinion gear and a second pinion gear and to which power input from an electric motor is transmitted; a power transmission mechanism further includes a gear meshing with the external teeth of the ring gear; and a second clutch capable of non-rotatably fixing the ring gear at the time of causing a vehicle to travel backward with power input from an engine is provided between the ring gear and a transmission case.

13 Claims, 3 Drawing Sheets

(51) Int. Cl.
*B60K 6/543* (2007.10)
*B60W 10/02* (2006.01)
*B60W 10/10* (2012.01)
*B60W 30/18* (2012.01)

(52) U.S. Cl.
CPC ...... *B60W 10/10* (2013.01); *B60W 30/18036* (2013.01); *B60Y 2200/92* (2013.01)

(56) References Cited

U.S. PATENT DOCUMENTS

| | | | |
|---|---|---|---|
| 10,286,898 B2 * | 5/2019 | Ono | B60W 20/00 |
| 10,471,818 B2 * | 11/2019 | Oba | B60K 6/365 |
| 2001/0049570 A1 | 12/2001 | Yamaguchi et al. | |
| 2003/0060948 A1 | 3/2003 | Yamaguchi et al. | |
| 2012/0310462 A1 | 12/2012 | Kuroda et al. | |

FOREIGN PATENT DOCUMENTS

| | | | | |
|---|---|---|---|---|
| JP | 2001-339805 A | | 12/2001 | |
| JP | 2012-236508 A | | 12/2012 | |
| JP | 2013-53641 A | | 3/2013 | |
| JP | 2015-6887 A | | 1/2015 | |
| JP | 2016-132270 A | | 7/2016 | |
| KR | 20080063428 A | * | 7/2008 | |
| WO | WO-2017069042 A1 | * | 4/2017 | ............... B60K 1/00 |

OTHER PUBLICATIONS

Japanese-language Office Action issued in Japanese Application No. 2020-500355 dated May 11, 2021 with English translation (7 pages).

* cited by examiner

DRIVE DEVICE, AND VEHICLE

TECHNICAL FIELD

The present invention relates to a drive device that drives a vehicle using an internal combustion engine and an electric motor as drive sources generally, and a vehicle.

BACKGROUND ART

In recent years, a hybrid vehicle equipped with an internal combustion engine (hereinafter also referred to as an engine) and an electric motor (hereinafter also referred to as a motor generator, or simply a motor) as drive sources and capable of achieving engine single travel, motor single travel, and combined travel in which the power of the engine and the power of the motor are combined has been put into practical use.

As a drive device for a hybrid vehicle, PTL 1 discloses a configuration example of a hybrid vehicle based on a continuously variable transmission (CVT). The hybrid vehicle of PTL 1 has a planetary gear mechanism and a clutch combined so that a required drive force can be obtained without co-rotation of a continuously variable transmission mechanism at the time of motor single travel and without relying on expansion of the ratio coverage (change gear ratio width) of a continuously variable transmission mechanism at engine single travel.

As a drive device for a hybrid vehicle, PTL 2 discloses a configuration example of a hybrid vehicle based on an automated manual transmission (AMT) having a manual transmission (MT) structure. The hybrid vehicle of PTL 2 is provided with a clutch capable of cutting a path for transmitting power to the driving wheels so as to be able to generate electric power even in vehicle stop time.

CITATION LIST

Patent Literatures

PTL 1: JP 2016-132270 A
PTL 2: JP 2012-236508 A

SUMMARY OF INVENTION

Technical Problem

PTL 1 only describes application of a double pinion type planetary gear mechanism when reversing the rotation direction of the planetary gear mechanism.

In a case where the electric motor becomes an abnormal state during travel for example, the hybrid vehicle of PTL 2 cannot maintain travel because the power transmission of the engine is interrupted if the electric motor is disconnected. Accordingly, the hybrid vehicle of PTL 2 cannot travel backward by the engine alone in a state where the electric motor is disconnected.

The present invention has been made in view of the above problem, and its object is to provide a technique for traveling backward by an internal combustion engine alone in a state where an electric motor is disconnected.

Solution to Problem

In order to achieve the above object, a drive device according to one aspect of the present invention is a drive device driving a vehicle having a power transmission mechanism including a sun gear to which power input from an internal combustion engine is transmitted, a ring gear which meshes with the sun gear via at least a one-step pinion gear and to which power input from an electric motor is transmitted, and a carrier rotatably supporting the pinion gear and transmitting power from at least either of the internal combustion engine or the electric motor to wheels, and a fixing portion supporting the power transmission mechanism, wherein external teeth are formed on an outer periphery of the ring gear, the power transmission mechanism further includes a gear meshing with the external teeth of the ring gear, and a ring gear fixing mechanism capable of non-rotatably fixing the ring gear at the time of causing the vehicle to travel backward with the power input from the internal combustion engine is provided between the ring gear and the fixing portion.

Advantageous Effects of Invention

According to the present invention, it is possible to travel backward by an internal combustion engine alone in a state where an electric motor is disconnected.

DESCRIPTION OF EMBODIMENTS

Figure 1:
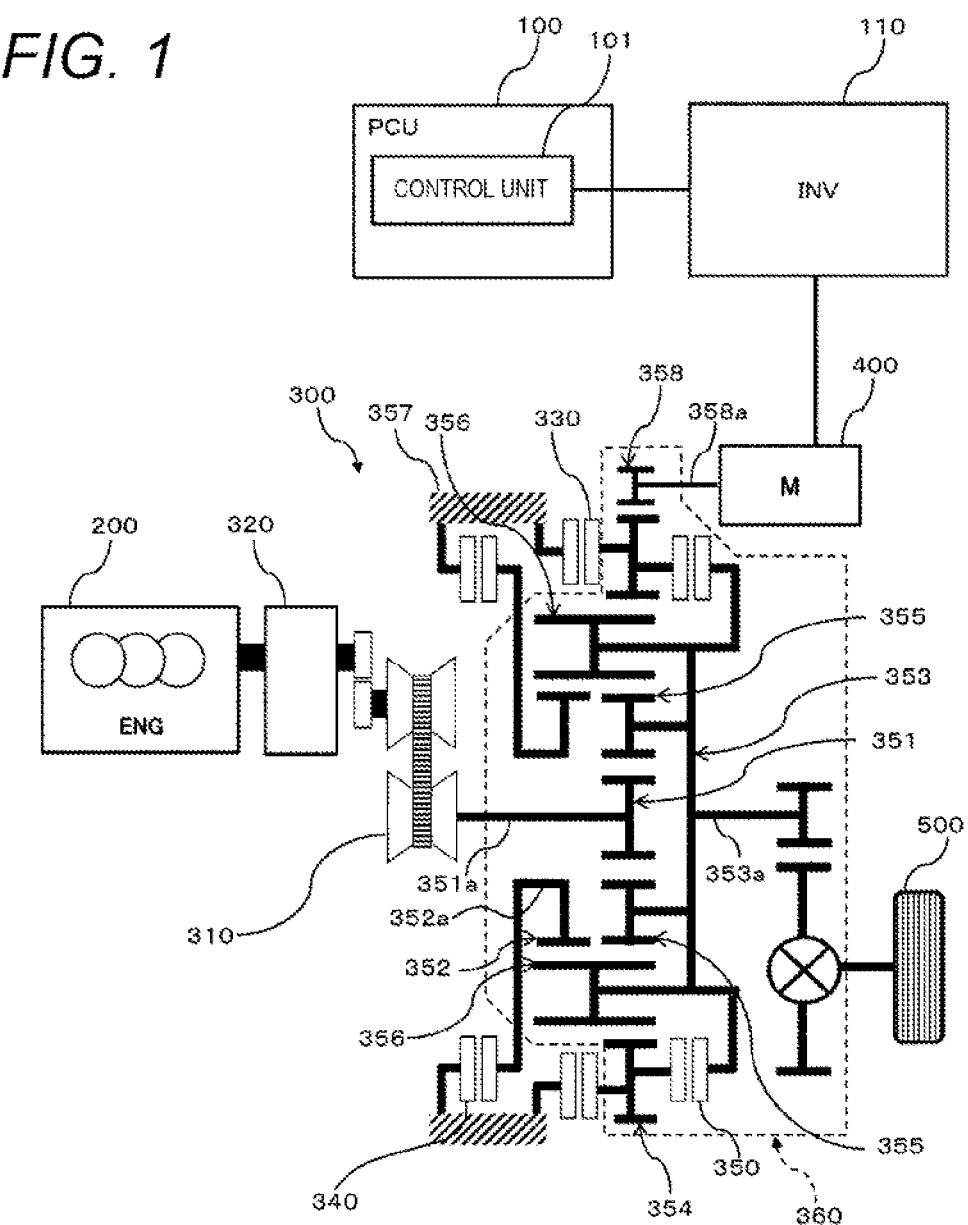
FIG. 1 is a view illustrating a configuration example of a drive system of a hybrid vehicle according to the present embodiment.

FIG. 1 is a view illustrating a configuration example of the drive system of the hybrid vehicle according to the present embodiment. The hybrid vehicle as an example of a "vehicle" of the present embodiment includes an engine 200 as an example of an "internal combustion engine", a drive device 300, a power control unit (PCU) 100, and an inverter 110.

The drive device 300 includes a first clutch 320 as an example of an "engine disconnection/connection mechanism", a transmission 310, a power transmission mechanism 360 transmitting power input from the transmission 310 to a wheel 500 side, a transmission case 357 as an example of a "fixing portion" supporting the power transmission mechanism 360, and an electric motor 400 inputting/outputting power to/from the power transmission mechanism 360.

The first clutch 320 includes an unillustrated actuator capable of disconnecting/connecting the engine 200 and the transmission 310 by switching the engine 200 and the transmission 310 to a state of being engaged or disengaged. The first clutch 320 is a friction clutch frictionally transmitting power.

The transmission 310 changes the gear ratio of power from the engine 200 and transmits it to the power transmission mechanism 360. Here, a continuously variable transmission (CVT) is described as an example. However, the CVT may further include a transmission mechanism such as a planetary gear, a parallel-shaft gear, and a toroidal (cone) type, and is not limited to a specific transmission.

The power transmission mechanism 360 is a Ravigneaux planetary gear mechanism. The power transmission mechanism 360 includes a first sun gear 351 as an example of a "sun gear", a plurality of first pinion gears 355, a carrier 353, a plurality of second pinion gears 356, a ring gear 354, a second sun gear 352, and a gear 358.

Power input from the engine 200 is transmitted to the first sun gear 351. The first sun gear 351 has a rotation shaft 351*a* extended from one side toward the other side (engine 200 side in FIG. 1) and connected to the transmission 310 at the other end. External teeth are formed on the outer periphery of the first sun gear 351. The external teeth of the first sun gear 351 mesh with the external teeth of the first pinion gear 355.

The first pinion gear 355 is arranged on the outer periphery of the first sun gear 351. The first pinion gear 355 is extended from the other side toward one side (wheel 500 side in FIG. 1) and rotatably supported by the carrier 353. The external teeth are formed on the outer periphery of the first pinion gear 355. The external teeth of the first pinion gear 355 mesh with the external teeth of the first sun gear 351 on their inner peripheral side relative to the rotation center. The external teeth of the first pinion gear 355 are mesh with the external teeth of the second pinion gear 356 on their outer peripheral side relative to the rotation center.

The second pinion gear 356 is extended from the other side toward one side (wheel 500 side in FIG. 1) and rotatably supported by the carrier 353. The external teeth are formed on the outer periphery of the second pinion gear 356. The external teeth of the second pinion gear 356 mesh with the external teeth of the first sun gear 351 on their inner peripheral side relative to the rotation center at a part of one side (wheel 500 side in FIG. 1). The external teeth of the second pinion gear 356 mesh with the external teeth of the second sun gear 352 on their inner peripheral side relative to the rotation center at a part of the other side (engine 200 side in FIG. 1). The external teeth of the second pinion gear 356 mesh with internal teeth of the ring gear 354 on their outer peripheral side relative to the rotation center at a part of one side (wheel 500 side in FIG. 1).

The carrier 353 is arranged on one side (wheel 500 side in FIG. 1) of the first sun gear 351, the first pinion gear 355, the second pinion gear 356, and the ring gear 354. The carrier 353 has a flange rotatably supporting the first pinion gear 355 and the second pinion gear 356, and a rotation shaft 353*a* extended toward one side (wheel 500 side in FIG. 1) from the rotation center of the flange. The flange rotatably supports the second pinion gear 356 on the outer peripheral side of the rotation shaft 353*a* relative to the first pinion gear 355. The carrier 353 transmits power input from the engine 200 to the wheels 500. Furthermore, the carrier 353 transmits power input from the electric motor 400 to the wheels 500.

The ring gear 354 is arranged on the outer periphery of the second pinion gear 356. The internal teeth are formed on the inner periphery of the ring gear 354. The internal teeth of the ring gear 354 mesh with the external teeth of the second pinion gear 356. The external teeth are formed on the outer periphery of the ring gear 354. The external teeth of the ring gear 354 mesh with the external teeth of the gear 358.

The gear 358 is arranged so that the external teeth mesh with the external teeth of the ring gear 354. The gear 358 has a rotation shaft 358*a* extending from the other side toward one side (wheel 500 side in FIG. 1) and inputting/outputting power to/from the electric motor 400.

Between the ring gear 354 and the transmission case 357, a second clutch 330 as an example of a "ring gear fixing mechanism" capable of non-rotatably fixing the ring gear 354 is provided. The second clutch 330 includes an actuator capable of non-rotatably fixing the ring gear 354 by switching the ring gear 354 and the transmission case 357 to a state of being engaged or disengaged. The second clutch 330 is a friction clutch frictionally transmitting power.

The second sun gear 352 is arranged so that the external teeth mesh with the external teeth of the second pinion gear 356. The second sun gear 352 has a rotation shaft 352*a* extended from the other side to one side (engine 200 side in FIG. 1).

Between the second sun gear 352 and the transmission case 357, a third clutch (brake) 340 as an example of a "second sun gear fixing mechanism" is provided. The third clutch 340 includes an actuator capable of non-rotatably fixing the second sun gear 352 by switching the second sun gear 352 and the transmission case 357 to a state of being engaged or disengaged. The third clutch 340 is a friction clutch frictionally transmitting power.

Between the carrier 353 and the ring gear 354, a fourth clutch 350 as an example of a "carrier disconnection/connection mechanism" is arranged. The fourth clutch 350 includes an actuator capable of disconnecting/connecting the carrier 353 and the ring gear 354 by switching the carrier 353 and the ring gear 354 to a state of being engaged or disengaged. The fourth clutch 350 is a friction clutch frictionally transmitting power.

A non-illustrated battery is electrically connected to the electric motor 400 via the inverter 110. The inverter 110 converts direct current from the battery into alternating current. The electric motor 400 rotates in accordance with the alternating current converted by the inverter 110 and generates power that drives the wheels 500. Furthermore, the electric motor 400 generates power by power transmitted from the wheels 500. The alternating current generated by the electric motor 400 is converted into a direct current through the inverter 110, and charged in the battery.

The PCU 100 includes a control unit 101 electrically connected to the inverter 110. The control unit 101 controls drive of the engine 200, the transmission 310, the actuator of the first clutch 320, the actuator of the second clutch 330, the actuator of the third clutch 340, the actuator of the fourth clutch 350, and the electric motor 400.

Figure 2:
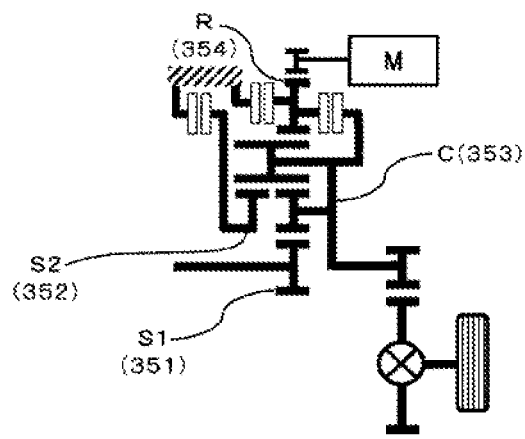
FIG. 2 is a schematic skeleton view of a drive device according to the present embodiment.
Figure 3:
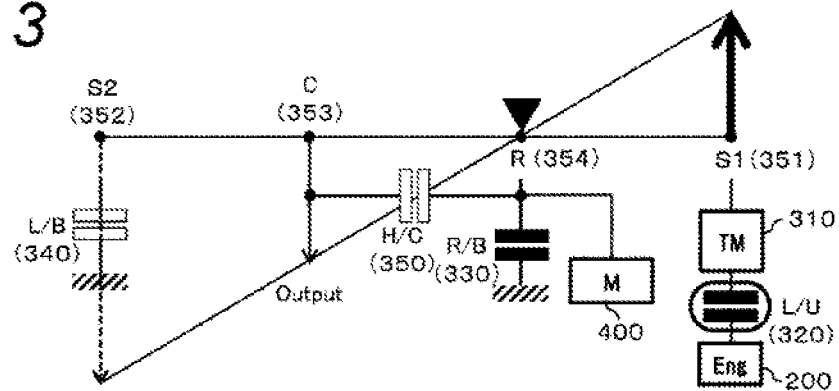
FIG. 3 is an alignment chart of an engine (Eng) of the present embodiment at the time of backward travel.

FIG. 2 is a schematic skeleton view of the drive device according to the present embodiment, and FIG. 3 is an alignment chart of the engine (Eng) 200 of the present embodiment at the time of backward travel. In FIGS. 2 and 3, of the first clutch 320, the second clutch 330, the third clutch 340, and the fourth clutch 350, those in a disengaged state are indicated by frame lines only (white), and those in an engaged state are indicated by fill (black) inside the frame lines.

At the time of backward travel, the rotation output from the transmission (TM) 310 needs to be reversed and transmitted to the wheels 500. The output from the transmission (TM) 310 is reversed when the ring gear (R) 354 is non-rotatably fixed. The ring gear (R) 354 is non-rotatably fixed to the transmission case 357 by engaging the second clutch 330. At this time, power from the engine (Eng) 200 is transmitted to the first sun gear (S1) 351 via the transmission (TM) 310, the carrier (C) 353 is reversed with the ring gear (R) 354 as a base point, and the wheels 500 to which power is transmitted from the carrier (C) 353 side are also reversed. This allows the hybrid vehicle to travel backward.

Figure 4:
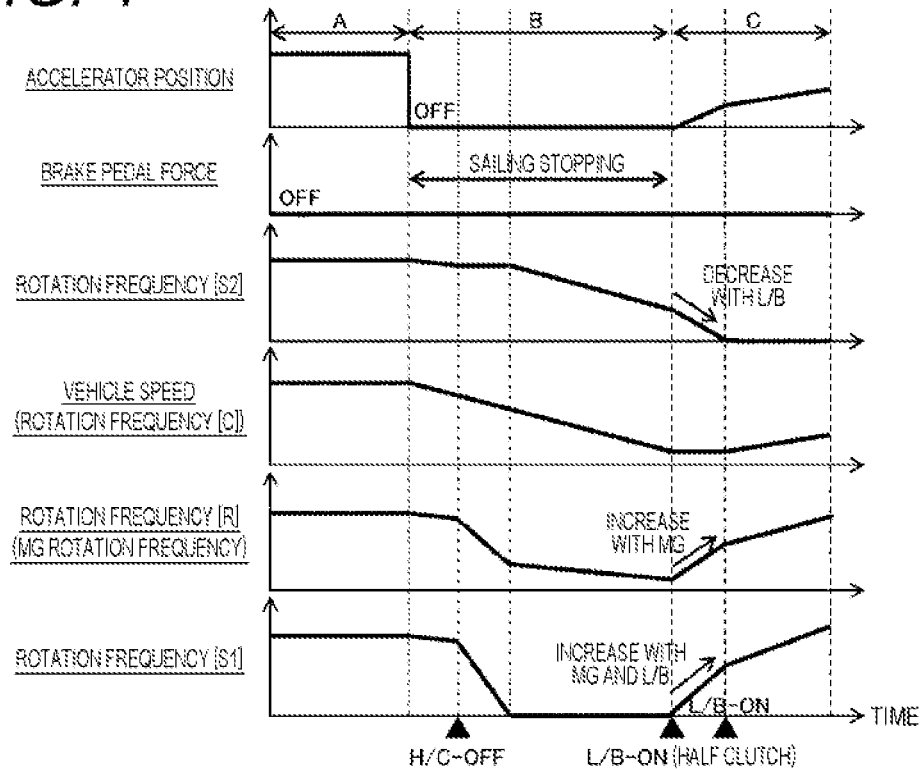
FIG. 4 is a timing chart of sailing travel control in the present embodiment.

FIG. 4 is a timing chart of sailing travel control in the present embodiment. FIG. 4 presents an accelerator position, a brake pedal force, a rotation frequency [S2] of the second sun gear 352, a vehicle speed (rotation frequency [C] of the carrier 353), a rotation frequency [R] of the ring gear 354 (rotation frequency of the electric motor (M) 400), and a rotation frequency [S1] of the first sun gear 351 at the time of sailing travel control.

Hereinafter, a case in which the vehicle travel state is shifted from a travel state A by normal travel control to a travel state B by sailing travel (engine stopping during inertial travel) control, and then returned to a travel state C by the normal travel control will be described. During the sailing travel control, the engine 200 has zero torque.

Figure 5:
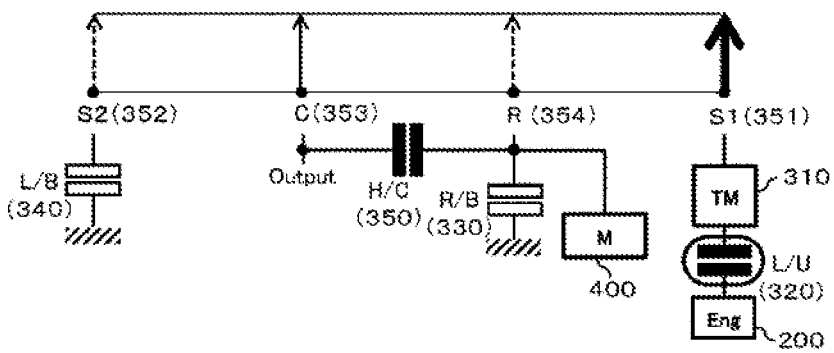
FIG. 5 is an alignment chart at the time of normal travel control of the present embodiment.

FIG. 5 is an alignment chart at the time of normal travel control of the present embodiment.

When the vehicle is in the travel state A by the normal travel control, the control unit 101 engages the first clutch (L/U) 320 and the fourth clutch (H/C) 350 and disengages the second clutch (R/B) 330 and the third clutch (L/B) 340. As a result, the ring gear (R) 354 is engaged with the carrier (C) 353. At this time, the power from the engine (Eng) 200 is transmitted to the first sun gear (S1) 351 via the transmission (TM) 310, the carrier (C) 353 rotates normally, and the wheels 500 to which the power is transmitted from the carrier (C) 353 side also rotate normally. This allows the hybrid vehicle to travel forward.

Figure 6:
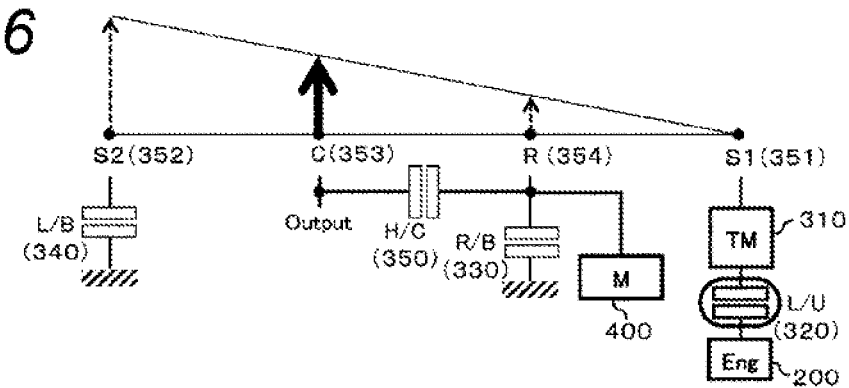
FIG. 6 is an alignment chart at the time of sailing travel control of the present embodiment.

FIG. 6 is an alignment chart at the time of sailing travel control of the present embodiment.

When the vehicle is in the travel state B by the sailing travel control, the control unit 101 disengages the first clutch (L/U) 320 and the fourth clutch (H/C) 350. As a result, all the clutches of the first clutch (L/U) 320, the second clutch (R/B) 330, the third clutch (L/B) 340, and the fourth clutch (H/C) 350 are disengaged. Specifically, the fourth clutch (H/C) 350 is fully disengaged at the time of H/C-OFF in FIG. 6. At this time, the power from the wheels 500 is transmitted to the carrier (C) 353 connected with the wheels 500 via an axle, the ring gear (R) 351 rotates normally with the first sun gear (S1) 354 as a starting point, and the electric motor (M) 400 connected with the ring gear (R) 354 via the gear 358 also rotates normally. Thus, the hybrid vehicle can generate power while maintaining the travel state B by the sailing stop control.

Return to FIG. 4. The accelerator position is large in the travel state A. When the accelerator position becomes zero (OFF), the vehicle shifts from the normal travel control to the sailing travel control and enters the travel state B.

Thereafter, as the accelerator position gradually increases, the vehicle returns from the sailing travel control to the normal travel control and enters the travel state C.

A brake pedal force is zero (OFF) during the period from the travel state A to the travel state C.

The rotation frequency [S2] of the second sun gear 352 is high in the travel state A. The rotation frequency [S2] of the second sun gear 352 gradually decreases in the travel state B, is maintained for a predetermined period after the fourth clutch 350 is disengaged, and further decreases until the third clutch 340 is in a half-engaged state (Half clutch. L/B-ON (half clutch) in FIG. 4). The rotation frequency [S2] of the second sun gear 352 further decreases by the third clutch 340 becoming in the half-engaged state in the travel state C, and becomes zero when in a fully engaged state (L/B-ON in FIG. 4).

Here, if the third clutch 340 is rapidly and fully engaged, a shock in accordance with a rotation frequency difference between the second pinion gear 356 and the transmission case 357, i.e., the rotation frequency of the second pinion gear 356, is generated, thereby leading to deterioration of drivability and clutch damage, and hence the clutch is in the half-engaged state (half clutch). The rotation frequency difference between the second sun gear 352 and the transmission case 357, i.e., the rotation frequency of the second sun gear 352, decreases due to load (friction) generated by the half-engaged state. In parallel with this operation, the rotation frequency [R] of the ring gear 354 and the rotation frequency [S1] of the first sun gear 351 increase.

The vehicle speed (rotation frequency [C] of the carrier) is high in the travel state A. In the travel state B, the vehicle speed gradually decreases until the third clutch 340 is in the half-engaged state (half clutch). In the travel state C, the vehicle speed gradually increases when the third clutch 340 is in the fully engaged state after being maintained for a predetermined period of time.

The rotation frequency [R] of the ring gear 354 (rotation frequency of the electric motor) is high in the travel state A. The rotation frequency [R] of the ring gear 354 gradually decreases in the travel state B, further decreases when the fourth clutch 350 is disengaged, and gently decreases until the third clutch 340 is in the half-engaged state (half clutch) when the rotation frequency [S1] of the first sun gear 351 becomes zero. In the travel state C, the rotation frequency [R] of the ring gear 354 increases when the power of the electric motor 400 is transmitted, and gradually increases when the third clutch 340 is fully engaged.

The rotation frequency [S1] of the first sun gear 351 is high in the travel state A. The rotation frequency [S1] of the first sun gear 351 gradually decreases in the travel state B, and further decreases to zero until the third clutch 340 is in the half-engaged state (half clutch) when the fourth clutch 350 is disengaged.

In the travel state C, the rotation frequency [S1] of the first sun gear 351 increases when the third clutch 340 is engaged and the power of the electric motor 400 is transmitted, and gradually increases when the third clutch 340 is fully engaged.

Figure 7:
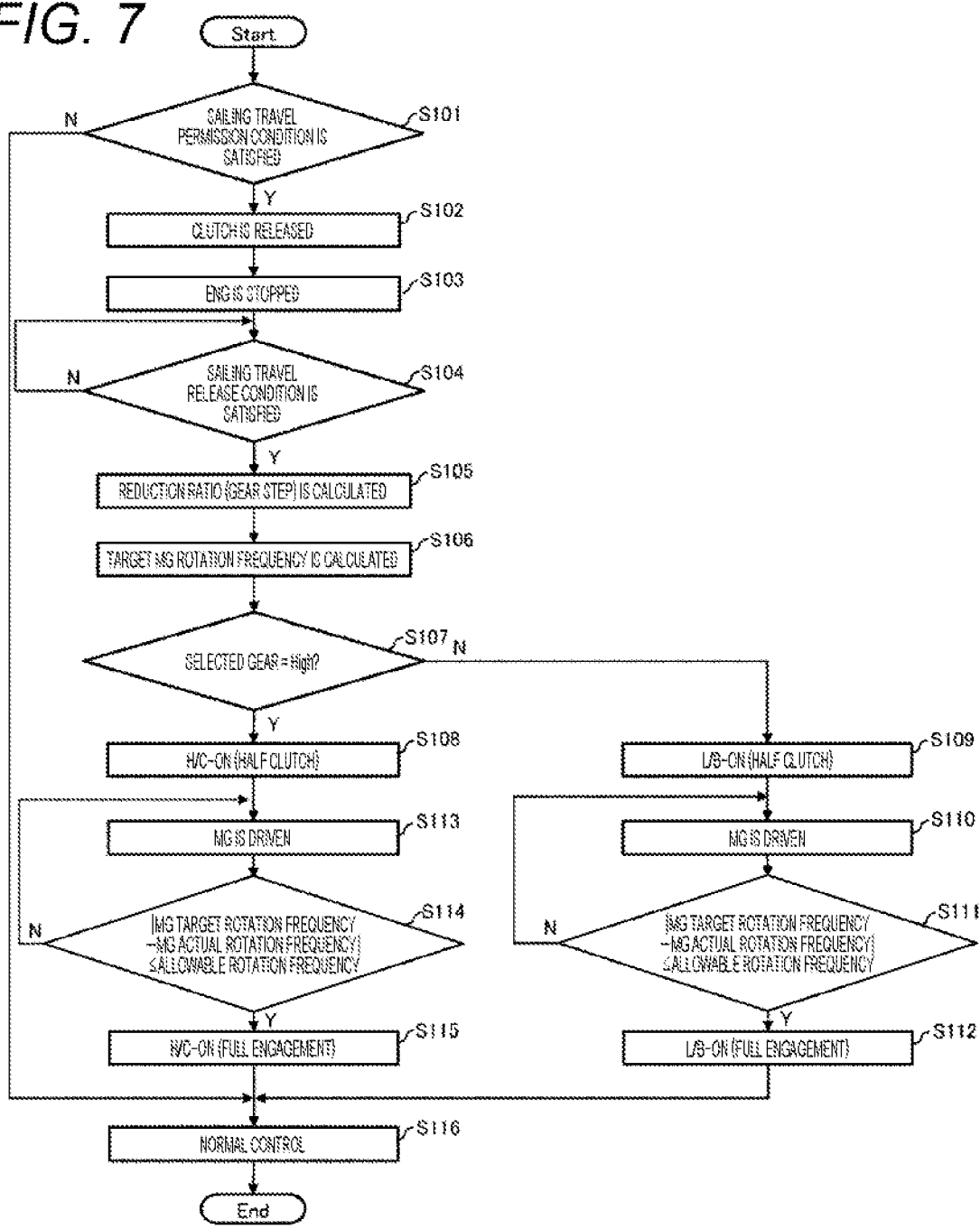
FIG. 7 is a chart illustrating a control flow of sailing travel in the present embodiment.

FIG. 7 is the control flow of the sailing travel in the present embodiment.

In step S101, the control unit 101 determines whether none of an acceleration request or a deceleration request for the vehicle exists based on signal information transmitted/received within the vehicle that realizes the vehicle travel. That is, the control unit 101 determines whether a sailing travel permission condition is satisfied.

The sailing travel permission condition is determined based on information such as the presence/absence of an acceleration request based on the accelerator position, the presence/absence of a deceleration request based on a brake pedal operation amount (fluid pressure, pedal force, and the like), a warm-up state of the engine 200 based on the water temperature, negative pressure in a brake booster, the vehicle speed at which a fuel consumption effect by the sailing stop is obtained. The signal information used for the sailing travel permission condition may increase or decrease. For example, in the case where the remaining battery capacity is small and priority is given to energy recovery by power generation or regeneration, the remaining battery capacity (voltage) may be added to the sailing travel permission condition. In addition, in a case where there is a deceleration request in accordance with a following distance with a preceding vehicle, a speed difference, an acceleration difference, and the like based on a detection result of an external recognition sensor that is an automatic drive technology, a state (following distance, speed difference, acceleration difference, and the like) with the preceding vehicle by the external recognition sensor may be added to the sailing travel permission condition.

If the determination result of step S101 is true (S101: Y), the control unit 101 proceeds to step S102. If the determination result of step S101 is false (S101: N), the control unit 101 shifts to the normal travel control of step S116.

In step S102, the control unit 101 proceeds to execution of sailing travel. In step S102, all the clutches from the first clutch 320 to the fourth clutch 350 are disengaged in order to minimize the rotational load of the wheels 500. Due to this, the elements serving as the rotational load of the wheels 500 such as the engine 200 and the electric motor 400 are separated from the power transmission mechanism 360 to which power is transmitted from the wheels 500 side.

In step S103, after recognizing that all the clutches from the first clutch 320 to the fourth clutch 350 have been in the disengaged state, the control unit 101 stops the fuel injection of the engine 200, thereby suppressing the fuel consumption. Furthermore, since the first clutch 320 is in the disengaged state, engine friction can be minimized even if the rotation frequency of the engine 200 is zero.

In step S104, the control unit 101 determines whether a sailing travel release condition is satisfied. The determination condition is whether at least one or more conditions of step S101 are not satisfied (sailing travel release condition is satisfied). If the determination result of step S104 is true (S104: Y), the control unit 101 releases the sailing travel control and shifts to a return process toward the normal travel control. If the determination result of step S104 is false (S104: N), the control unit 101 maintains the sailing travel control and determines whether the sailing travel release condition is satisfied again.

In step S105, the control unit 101 calculates a reduction ratio (gear step) of the vehicle in accordance with the rotation frequency (vehicle speed) of the wheels 500 before engaging the clutches disengaged during the sailing travel control of the first clutch 320 to the fourth clutch 350. If the reduction ratio (gear step) in accordance with the acceleration request or the deceleration request of the vehicle is appropriately selected, the shock at the time of clutch engagement is reduced. The reduction ratio (gear step) selected at this time becomes easier to secure appropriate responsiveness by selecting a reduction ratio (gear step) at which the drive force increases as the degree of the acceleration request or the deceleration request of the vehicle increases.

In step S106, the control unit 101 calculates a target rotation frequency of an output shaft (rotation shaft 358a) of the electric motor 400 in accordance with the reduction ratio (gear step) calculated in step S105 and the rotation frequency (vehicle speed) of the wheels 500. The target rotation frequency of the output shaft of the electric motor 400 is a target value on the assumption of the timing of shifting from the travel state B to the travel state C and fully engaging the third clutch 340. At the time of calculating the target rotation frequency, it is desirable to set the target rotation frequency in consideration of variations in the sensor, errors in the sensor, the detection cycle of the sensor, backlash of the gear, and the like, which allows the vehicle travel state to be controlled more accurately.

In step S107, the control unit 101 determines whether the gear step of the power transmission mechanism 360 has selected high speed (High). The gear step is selected based on the result calculated in step S105. If the determination result of step S107 is true (S107: Y), the control unit 101 shifts to step S108. If the determination result of step S107 is false (Low) (S107: N), the control unit 101 shifts to step S109.

In step S109, the control unit 101 starts engagement of the third clutch 340, which is the low-speed gear step, by the actuator. In step S109, at the time when the rotation frequency of the second sun gear 352 is decreasing or the rotation frequency of the first sun gear 351 is increasing, the vehicle speed decreases by friction.

Here, in step S110, the travel state C is an acceleration request, and hence the decrease in the vehicle speed is contrary to the acceleration request. Therefore, in step S110, the electric motor 400 is driven in order to avoid a decrease in the vehicle speed. At this time, the control unit 101 drives the electric motor 400 in a direction where the rotation frequency of the ring gear 354 increases. This causes the rotation frequency of the first sun gear 351 to also increase. Furthermore, the control unit 101 appropriately drives the electric motor 400 to adjust the distribution of the engagement ratio of the third clutch 340. This allows the vehicle speed to increase while avoiding decrease in the vehicle speed due to friction, and hence the acceleration request can be met.

In step S111, after driving the electric motor 400, the control unit 101 determines whether the absolute value of the difference between an MG target rotation frequency and an MG actual rotation frequency is equal to or less than a preset allowable rotation frequency.

Here, an allowable rotation difference is set in accordance with the durability of the components, the drivability of the vehicle, and the quality level of the sound vibration. In general, the higher the quality level is, the smaller the allowable rotation difference becomes. If the determination result of step S111 is true (S111: Y), the control unit 101 shifts to step S112. If the determination result of step S111 is false (S111: N), the control unit 101 returns to step S110.

In step S112, the control unit 101 causes the third clutch 340 to be in from the half-engaged state to the fully engaged state by the actuator. Thereafter, the control unit 101 shifts to the normal travel control of step S116.

In step S108, the control unit 101 starts engagement of the fourth clutch 350, which is the high-speed gear step, by the actuator. Here, if the fourth clutch 350 is rapidly and fully engaged, a shock in accordance with a rotation frequency difference between the carrier 353 and the ring gear 354, i.e., the rotation frequency of the carrier 353, is generated, thereby leading to deterioration of drivability and clutch damage, and hence the clutch is in the half-engaged state (half clutch). The rotation frequency difference between the carrier 353 and the ring gear 354, i.e., the rotation frequency of the carrier 353 decreases due to the load (friction) generated in association with the half-engaged state. In step S108, when in the state where the rotation frequency difference between the carrier 353 and the ring gear 354 is decreasing, the vehicle speed decreases by friction.

Here, in step S113, the travel state C is an acceleration request, and hence the decrease in the vehicle speed is contrary to the acceleration request. Therefore, in step S113, the electric motor 400 is driven in order to avoid a decrease in the vehicle speed. At this time, the control unit 101 drives the electric motor 400 in a direction where the rotation frequency of the ring gear 354 increases. This causes the rotation frequency of the first sun gear 351 to also increase. Furthermore, the control unit 101 appropriately drives the electric motor 400 to adjust the distribution of the engagement ratio of the fourth clutch 350. This allows the vehicle speed to increase while avoiding decrease in the vehicle speed due to friction, and hence the acceleration request can be met.

In step S114, after driving the electric motor 400, the control unit 101 determines whether the absolute value of the difference between the MG target rotation frequency and the MG actual rotation frequency is equal to or less than the preset allowable rotation frequency.

Here, an allowable rotation difference is set in accordance with the durability of the components, the drivability of the vehicle, and the quality level of the sound vibration. In general, the higher the quality level is, the smaller the allowable rotation difference becomes. If the determination result of step S114 is true (S114: Y), the control unit 101 shifts to step S115. If the determination result of step S114 is false (S114: N), the control unit 101 returns to step S113.

In step S115, the control unit 101 causes the fourth clutch 350 to be in from the half-engaged state to the fully engaged state by the actuator. Thereafter, the control unit 101 shifts to the normal travel control of step S116.

According to this configuration, the power transmission mechanism 360 further includes the gear 358 meshing with the external teeth formed on the outer periphery of the ring gear 354, and the second clutch 330 capable of non-rotatably fixing the ring gear 354 at the time of causing the vehicle to travel backward with the power input from the engine 200 is provided between the ring gear 354 and the transmission case 357. Due to this, when the electric motor 400 has a functional failure, non-rotatably fixing the ring gear 354 allows the vehicle to travel backward by the engine 200 alone with a simple configuration.

Furthermore, since the power transmission mechanism 360 further includes the fourth clutch 350 capable of disconnecting/connecting the ring gear 354 and the carrier 353, the gear ratio of the drive device 300 can be changed by disconnection/connection of the fourth clutch 350.

In addition, the power transmission mechanism 360 further includes the second sun gear 352 meshing with the second pinion gear 356, and the third clutch 340 capable of non-rotatably fixing the second sun gear 352 is provided between the second sun gear 352 and the transmission case 357. Due to this, non-rotatably fixing the second sun gear 352 allows the gear ratio of the drive device 300 to be changed.

Furthermore, since the second clutch 330 and the fourth clutch 350 are friction clutches, the clutch can have a simple structure.

Furthermore, the power transmission mechanism 360 includes the first pinion gear 355 meshing with the first sun gear 351 and rotatably supported by the carrier 353, and the second pinion gear 356 meshing with the first pinion gear 355 and the first sun gear 351 and rotatably supported by the carrier 353. This allows the first pinion gear 355 and the second pinion gear 356 to be compactly arranged, leading to downsizing and mountability improvement of the power transmission mechanism 360.

The present invention is not limited to the above-described embodiment, and includes various modifications.

In the above-described embodiment, the transmission 310 is an example of the continuously variable transmission, but the present invention is not limited thereto, and a stepped automatic transmission (AT), a dual clutch transmission (DCT), an AMT, and the like can be used.

For example, the gear ratio of the power transmission mechanism 360 may be set such that the rotation frequency of the electric motor 400 during power generation is higher than the rotation frequency of the engine 200. This allows the electric motor 400 to be set to a rotation frequency with high power generation efficiency, and power generation efficiency to be increased.

For example, the control unit 101 may operate the electric motor 400 as a power generator by controlling each of the actuators so as to engage the first clutch 320 and the second clutch 330 and disengage the third clutch 340 and the fourth clutch 350 at the time of stop of the wheels 500. This allows electric power to be generated by transmitting the power of the engine 200 to the electric motor 400 at the time when the vehicle is stopped.

For example, the control unit 101 may control each of the actuators so as to start engagement of the third clutch 340 or the fourth clutch 350 before driving the electric motor 400 in the case of returning from the sailing travel control to the normal travel control. This allows the power from the electric motor 400 to be prevented from being rapidly transmitted to the power transmission mechanism 360.

REFERENCE SIGNS LIST 101 control unit
200 engine
300 drive device
320 first clutch
330 second clutch
340 third clutch
350 fourth clutch
351 first sun gear
352 second sun gear
353 carrier
354 ring gear
355 first pinion gear
356 second pinion gear
357 transmission case
358 gear
360 power transmission mechanism
400 electric motor
500 wheels

The invention claimed is:

1. A drive device driving a vehicle having a power transmission mechanism including a sun gear to which power input from an internal combustion engine is transmitted, a ring gear which meshes with the sun gear via a pinion gear and to which power input from an electric motor is transmitted, and a carrier rotatably supporting the pinion gear and transmitting power from either the internal combustion engine or the electric motor to wheels, and
a fixing portion supporting the power transmission mechanism,
wherein external teeth are formed on an outer periphery of the ring gear,
the power transmission mechanism further includes a gear meshing with the external teeth of the ring gear, and
a ring gear fixing mechanism capable of non-rotatably fixing the ring gear at a time of causing the vehicle to travel backward with power input from the internal combustion engine is provided between the ring gear and the fixing portion.

2. The drive device according to claim 1, wherein the power transmission mechanism further includes a carrier disconnection/connection mechanism capable of disconnecting/connecting the ring gear and the carrier.

3. The drive device according to claim 2, wherein
the power transmission mechanism further includes a second sun gear meshing with the pinion gear, and a second sun gear fixing mechanism capable of non-rotatably fixing the second sun gear is provided between the second sun gear and the fixing portion.

4. The drive device according to claim 1, wherein an engine disconnection/connection mechanism capable of operating the electric motor as a power generator by engaging the internal combustion engine and the power transmission mechanism when the wheels are stopped is provided between the internal combustion engine and the power transmission mechanism.

5. The drive device according to claim 3, wherein at least either the second sun gear fixing mechanism or the carrier disconnection/connection mechanism is in a half-engaged state when returning from sailing travel control to normal travel control.

6. The drive device according to claim 3, wherein at least either the ring gear fixing mechanism or the carrier disconnection/connection mechanism is a friction clutch.

7. The drive device according to claim 1, wherein a gear ratio of the power transmission mechanism is set so that a rotation frequency of the electric motor during power generation is higher than a rotation frequency of the internal combustion engine.

8. The drive device according to claim 1, wherein the power transmission mechanism includes a first pinion gear meshing with the sun gear and rotatably supported by the carrier, and a second pinion gear meshing with the first pinion gear and the ring gear and rotatably supported by the carrier.

9. A vehicle, comprising: an internal combustion engine; a power transmission mechanism connected between the internal combustion engine and wheels, an electric motor connected to the power transmission mechanism, and a fixing portion supporting the power transmission mechanism,
wherein the power transmission mechanism includes a sun gear to which power input from the internal combustion engine is transmitted, a ring gear which meshes with the sun gear via a pinion gear and to which power input from the electric motor is transmitted, a carrier rotatably supporting the pinion gear and transmitting power from at least either the internal combustion engine or the electric motor to the wheels, and a gear meshing with external teeth formed on an outer periphery of the ring gear,
a ring gear fixing mechanism capable of non-rotatably fixing the ring gear at a time of causing the vehicle to travel backward with power input from the internal combustion engine is provided between the ring gear and the fixing portion, and
a control unit controlling an actuator of the ring gear fixing mechanism is included.

10. The vehicle according to claim 9, wherein
the power transmission mechanism further includes a carrier disconnection/connection mechanism capable of disconnecting/connecting the ring gear and the carrier, and
the control unit controls each actuator so as to engage the ring gear fixing mechanism and disengage the carrier disconnection/connection mechanism at a time of causing the vehicle to travel backward with power input from the internal combustion engine.

11. The vehicle according to claim 10, wherein
the power transmission mechanism further includes a second sun gear meshing with the pinion gear, and
a second sun gear fixing mechanism capable of non-rotatably fixing the second sun gear is provided between the second sun gear and the fixing portion.

12. The vehicle according to claim 9, wherein
an engine disconnection/connection mechanism capable of disconnecting/connecting the internal combustion engine and the power transmission mechanism is provided between the internal combustion engine and the power transmission mechanism, and
the control unit operates the electric motor as a power generator by controlling each actuator so as to engage the engine disconnection/connection mechanism and the ring gear fixing mechanism when the wheels are stopped.

13. The vehicle according to claim 11, wherein the control unit controls each actuator so as to start engagement of the carrier disconnection/connection mechanism or the second sun gear fixing mechanism before driving the electric motor in a case of returning from sailing travel control to normal travel control.

* * * * *